Sept. 19, 1967  J. L. WHERRY  3,342,292
TRAILER BRAKE ACTUATOR
Filed Dec. 24, 1964
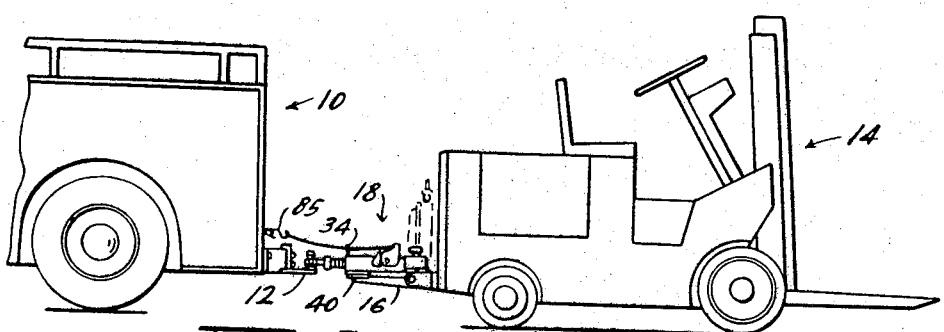
FIG-1-
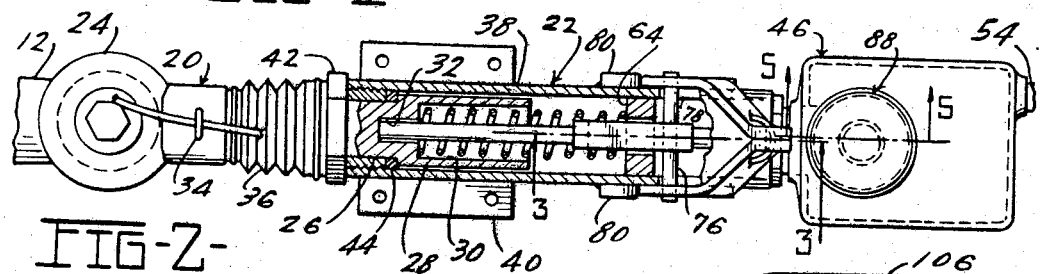
FIG-2-
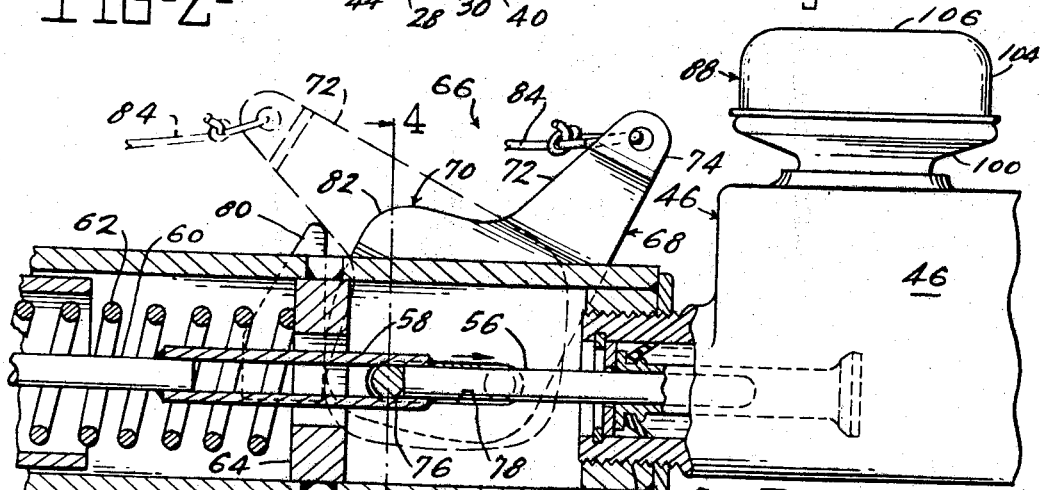
FIG-3-
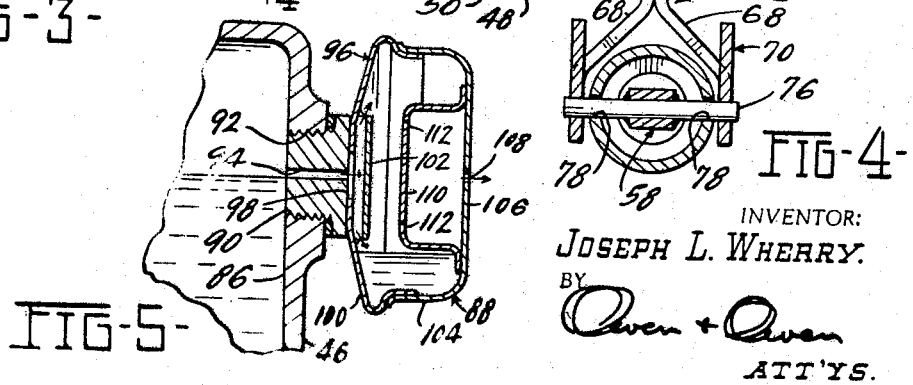
FIG-4-
FIG-5-
INVENTOR:
JOSEPH L. WHERRY.
BY
Owen + Owen
ATT'YS.

United States Patent Office 3,342,292
Patented Sept. 19, 1967

3,342,292
TRAILER BRAKE ACTUATOR
Joseph L. Wherry, Perrysburg, Ohio, assignor to Toledo Stamping & Manufacturing Company, Toledo, Ohio, a corporation of Ohio
Filed Dec. 24, 1964, Ser. No. 420,983
9 Claims. (Cl. 188—112)

This invention relates to a trailer brake actuator for connecting towing and towed vehicles and for actuating brakes of the towed vehicle.

Trailer brake actuators are now well known in the art and have become increasingly popular as their operation and advantages have become better known. Most trailer brake actuators heretofore known have been equipped with break-away levers which are connected to the towing vehicle by an independent line so that, should the towed vehicle become disconnected from the towing vehicle, the line will cause the lever to actuate the brakes and thereby stop the trailer. With the vehicle and trailer disconnected, the independent line will break shortly after applying the brakes through the lever. However, the brakes continue to be applied by virtue of the fact that the break-away lever is equipped with a pawl and ratchet mechanism for holding the brake lever in the energized position. While the pawl and ratchet mechanism has been generally satisfactory, the pawl occasionally will become stiff due to dirt, rust, etc., and will not catch in the teeth of the ratchet when the lever is actuated. Consequently, the lever will return to or near to its original position after the emergency line breaks, and the trailer brakes will thereby be released or substantially released. The trailer then is free to continue undirected until hitting an object or stopping on its own accord, usually the former.

The trailer brake actuator according to the invention has an improved break-away mechanism which is less complicated, less expensive, and more reliable than those heretofore known. The new break-away mechanism employs a cam principle which holds the lever in engagement, when actuated, under any conditions. No moving parts are involved in the new mechanism other than the lever itself so that there is no opportunity for pivots to rust or jam. The simplified design also lowers the cost of the mechanism in addition to making it more reliable.

The trailer brake actuator in accordance with the invention also incorporates a secondary retainer for brake fluid used in a master cylinder of the actuater. The unique retainer prevents any brake fluid from being ejected or blown from the master cylinder or cylinder reservoir during unusually hard stops, as has heretofore occurred with some master cylinders. The secondary retainer also prevents brake fluid from spilling from the brake reservoir in the event that the brake cylinder is tilted to a vertical position along with the actuator. Brake fluid is harmful to paint and even the loss of a small amount is damaging to surrounding surfaces.

It is, therefore, a principal object of the invention to provide an improved trailer brake actuator having a break-away lever with a cam arrangement for locking the break-away lever in position, which is simpler and more reliable.

Another object of the invention is to provide a trailer brake actuator with an additional brake fluid retainer for a reservoir for the master cylinder of the brake system.

Other objects and advantages of the invention will be apparent from the following detailed description of a preferred embodiment thereof, reference being made to the accompanying drawing, in which:

FIG. 1 is a somewhat schematic, fragmentary view of towing and towed vehicles connected by a trailer brake actuator in accordance with the invention;

FIG. 2 is a greatly enlarged, plan view of the trailer brake actuator shown in FIG. 1, with parts broken away and with parts in horizontal cross section;

FIG. 3 is a further enlarged, fragmentary view of a portion of the trailer brake actuator shown in FIG. 2, taken along the line 3—3 of FIG. 2;

FIG. 4 is a view in vertical cross section, on a smaller scale, taken along the line 4—4 of FIG. 3; and FIG. 5 is a fragmentary view in cross section taken along the line 5—5 of FIG. 2, with the actuator in a vertical position.

Referring particularly to FIG. 1, a towing vehicle in the form of a truck or the like, is indicated at 10 and has a suitable hitch connection 12. A towed vehicle, indicated at 14, is specifically shown as a forklift truck and has a pivoted tongue or tow bar 16 to which is affixed a trailer brake actuator 18 embodying the invention. In the specific application shown, the lift truck 14 can be moved from one job site to another by means of the towing vehicle 10 so as to be available wherever needed. When the forklift truck reaches its destination, the actuator 18 is unhooked from the hitch member 12, and the tow bar 16 and the actuator are pivoted to a vertical, out-of-the-way position, as shown in dotted lines. The actuator and the tow bar are kept in this position while the lift truck is in use, until it is desired to move the truck 14 to another location.

Referring to FIG. 2, the actuator 18 includes a first component 20 which is connected to the towing vehicle and a second component 22 which is affixed to the towed vehicle. The first component 20 basically includes a ring 24 which is placed over the hitch member 12 with the ring being affixed to a bar 26 which extends into the second component 22 and terminates in a cylindrical end 28 forming a recess 30. An additional, smaller recess 32 is centrally formed in the bar 26 concentrically with the recess 30. The first component 20 also has a guide 34 near the ring 24 and a bellows sleeve or dirt guard 36 surrounding a forward portion of the bar 26. One end of the bellows is affixed to the second component 22 and the other end is affixed to the first component 20, to the rear of the ring 24. The guard 36 thereby prevents the portion of the bar 26 which slides into and out of the second component 22 from being subjected to dirt or grit which could cause the bar 26 to bind.

The details of the second component 22 will now be discussed. This component includes a cylindrical housing 38 having a lower flange plate 40 welded thereto, which is bolted or otherwise suitably attached to the tow bar 16 of the forklift truck 14. A collar 42 is threadedly attached to the forward end of the housing 38, with the collar serving as a guide for the bar 26 as well as providing means for affixing the rear end of the bellows or dirt guard 36 to the second component. A bumper ring 44 is located at the inner end of the collar to serve as a resilient stop for the cylindrical portion 28 of the first component 20.

A master cylinder or brake actuating mechanism 46 is located at the rear of the housing 38 and has a threaded neck 48 threadedly received in an end wall 50 of the housing 38. The position of the master cylinder 46 is maintained by a lock nut 52 which is tightened against the end of the housing. The master cylinder 46 can be of the type shown in Yoder Patent 3,072,223 and the internal elements will not be discussed in detail. Basically, the master cylinder 46 operates in the usual manner by containing a piston which places brake fluid under pressure and transmits this pressume through a line 54 (FIG. 2) to the brakes of the towed vehicle.

A brake rod 56 extends forwardly of the master cylinder 46 in the housing 38. The brake rod 56 is affixed to a brake rod extension constituting both a slotted member 58 and a forward brake rod 60. The rod 60 is received in the recess 32 of the first component 20 and is pushed rearwardly when the first component 20 is moved rearwardly and the end of the rod 60 abuts the end of the recess 32. When this occurs, the brake rod 56 also is moved rearwardly to place the brake fluid in the master cylinder 46 under pressure and apply the brakes of the towed vehicle, in the usual manner. When the first component 20 moves forwardly relative to the second component 22, the gap between the recess 32 and the forward brake rod 60 in increased with the position of the forward brake rod 60 remaining the same relative to the brake cylinder.

A hold-off spring 62 is located around a portion of the slotted member 58 and the forward rod 60. One end of the spring abuts the end of the cylinder recess 30 and the other end abuts an annular stop member 64 which is affixed to the inner surface of the housing 38 around the slotted member 58. The spring then is compressed between the end of the recess 30 and the stop member 64 when the components 20 and 22 move together. The primary function of the spring 62 is to prevent unnecessary and undesirable actuation of the brakes when the vehicles are moving downhill, for example, or over rough road wherein a jerky, stop-start movement of the towed vehicle would otherwise result.

The break-away mechanism according to the invention includes a break-away yoke 66 which straddles the housing 38. The yoke 66 includes a pair of symmetrically opposite break-away arms 68, each of which comprises a cam 70 and a lever 72 terminating in ears 74. The arms 68 pivot about a common axle 76 which extends through oppositely-disposed slots 78 in the housing 38. The axle 76 also extends through a rear portion of the slotted member 58 so that during normal operation of the trailer brake actuator, the rod 56, the slotted member 58, and the forward brake rod 60 can move rearwardly without moving the break-away lever axle 76. However, when the axle 76 is moved rearwardly, it substantially immediately contacts the end of the brake rod 56 and causes the brakes to be applied.

A pair of bearing members or ears 80 are welded or otherwise suitably affixed to the housing 38 in front of the housing slots 78 and provide bearing edges which are always in contact with the cams 70 of the break-away arms 68. The cams are shaped such that the distance between the portions in contact with the bearing ears 80 and the axle 76 increases when the levers 72 are moved forwardly. Hence, should the levers 72 be moved forwardly, the axle 76 will be forced rearwardly and will similarly move the brake rod 56 rearwardly and apply the brakes. When moved sufficiently far, a lobe portion or high portion 82 of each of the cams 70 will move slightly beyond contact with the ears 80 and apply a force tending to prevent the return of the yoke 66 toward its original position. This position of the cam 70 is shown in dotted lines in FIG. 3. At this time, the point of contact between the cam 70 and the ear 80 will lie below the path of movement of the axle 76. However, with the friction involved, the yoke 66 will be held in position even if the lobe portion 82 of the cam 70 does not reach the ear 80 and the point of contact between the cam and ear does not quite reach the path of the axle 76. In any case, the cam 70 will contact the ear 80 substantially in the path of the axle 76.

The arms 68 will not be moved at all during normal operation of the brake actuator but should the actuator become detached from the towing vehicle, a line 84 in the form of a steel cable, chain, or rope, suitably connected to the towing vehicle and extending through the ring 34, will pull on the levers 72 to set the brakes. The arms 68 then will move in a forward direction to cause the cams 70 to force the axle 76 rearwardly as the cams abut the ears 80. When the yoke 66 reaches its maximum forward movement, a hook 85 attached to the line 84 will break or straighten, and the yoke 66, without the cams 70 would tend to return toward the original position, thereby releasing the brakes and enabling the towed vehicle to continue on until otherwise stopped. Pawl and ratchet arrangements have heretofore been used to prevent the return of the brake lever; however, they do not always function properly and, hence, do not serve their intended purpose.

The cam arrangement of the invention is always reliable and also is of simpler and lower cost design. By the time the yoke 66 has moved to its forward extremity, the high portion 82 of the cams will have moved beyond the point of contact with the abutment members 80 and the cams 70 will contact the members 80 below the path of travel of the axle 76. The cams will thereby prevent movement of the levers toward their normal position. The line 84, by passing through the guide 34, pulls the yoke 66 in a downward direction to assure its reaching the maximum forward position.

The master cylinder 46 includes a reservoir 86 at an upper portion thereof, as is conventional. Heretofore, it has been found that some of the brake fluid of the reservoir has had a tendency to spray or squirt outwardly through the vented cap for the reservoir if the brakes were applied exceptionally hard, particularly with master cylinders of the type in the aforesaid Patent 3,072,223. While the amount of fluid has been small, it tends to attack and remove paint from surrounding parts of the truck. Further, when the actuator 18 is pivoted to the vertical position of FIG. 1, some of the brake fluid again has had a tendency to leak through the usual vented cap, regardless of the type of master cylinder used.

In accordance with the invention, a brake fluid retainer 88 is substituted for the cap and prevents spraying and leaking of the brake fluid. The retainer 88 includes a threaded connecting member 90 threaded into a fill opening 92 of the reservoir, the connection having a central vent 94. A container 96 is affixed to the connecting member 90 and has a central opening 98 communicating with the vent 94. To a lower wall 100 of the container 96 is affixed a splash shield 102 which stops or diverts brake fluid which is expelled through the vent 94 during sudden stopping of the trailer. The shield 102 is square and is affixed to the bottom wall 100 only at the four corners so that a gap otherwise exists between the two. The container 96 also includes a cylindrical side wall 104 having an integral top wall 106 with a central vent 108. A cup-like member 110 is affixed concentrically to the top wall 106 and provides a shield against direct communication between brake fluid in the container and the vent 108. The member 110, however, does have four holes 112 to enable the container 96 to breathe.

The baffle-like arrangement in the container 96 virtually prevents the possibility of any brake fluid splashing out of the cylinder 46 since such fluid must pass the baffle 102 as well as the member 110. Further, the retainer 88 prevents brake fluid from spilling when the actuator 18 is moved to its vertical position and the reservoir 86 likewise assumes a vertical position. In such an instance, the container 96 is large enough so that even if the reservoir 86 is completely filled, the brake fluid draining into the container 96 will not even fill it half full so that the fluid cannot leak through the vent 108. Preferably, the capacity of the container 96 is such that all brake fluid draining through the vent 94 from the reservoir 86 with the actuator vertical will not even fill the container 96 to the vents 112 in the cup-like member 110. In such an instance, very little, if any, brake fluid will splash into the cup member 110 and such fluid will not be of sufficient quantity to splash out the opening 108 during operation of the fork-lift truck 14.

The retainer 88 basically comprises a container for excess fluid from the reservoir, being connected to the reservoir by a vented member. The container also includes a shield partially blocking the vent to block fluid ejected through the vent. Further, the retainer includes an internal container connected with the main one through suitable vent holes with the inner container communicating with the atmosphere through a central vent. While it is not essential that the retainer be circular in cross section, this is preferred so that the container will be properly oriented regardless of the position relative to the reservoir and the filler opening.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A trailer brake actuator comprising a first component having means for making a connection with a towing vehicle, a second component having means for making a connection with a towed vehicle, a master cylinder mounted on said second component and having a brake rod extending therefrom, a rod extension movable with said rod and engageable by said first component when moved rearwardly to actuate brakes of the towed vehicle, said rod extension having a slot, an axle extending through said slot and through slots in a housing of said second component, a cam mounted on each end of said axle outside said housing, bearing ears affixed to said housing in front of said cams, said cams having levers extending upwardly therefrom, a break-away line connected to said levers and adapted to be connected to said towing vehicle to move said levers forwardly when pulled by the towing vehicle, said cams positioned to engage said ears and force said axle rearwardly when said levers are pulled, said cams having high portions positioned to contact said ears before said levers reach their maximum forward positions to lock said cams and prevent their return to their original position, even when said line is released.

2. A trailer brake actuator comprising a first component having means for making an attachment to one of a towed and a towing vehicle, a second component having means for making a connection with the other of the towed and the towing vehicle, a master cylinder mounted on said second component and having a brake rod extending therefrom, a rod extension movable with said rod and engageable by said first component when moved rearwardly to actuate brakes of the towed vehicle, said rod extension having a slot, an axle extending through said slot and through slots in a housing of said second component, a cam mounted on each end of said axle outside said housing, bearing means affixed to said housing in front of said cams, said cams having levers extending therefrom, a break-away line connected to said levers and adapted to be connected to said towing vehicle to move said levers forwardly when pulled by the towing vehicle, said cams being positioned to engage said bearing means and force said axle rearwardly when said levers are pulled, said cams having portions positioned to contact said ears substantially in the path of travel of said axle when said levers reach their maximum forward positions to prevent the return of said levers toward their original position, even when said line is released.

3. A trailer brake actuator comprising a first component having means for making an attachment to one of a towed and a towing vehicle, a second component having means for making a connection with the other of the towed and the towing vehicle, a master cylinder mounted on said second component and having brake rod means extending therefrom and engageable by said first component when moved toward one another to actuate brakes of the towed vehicle, said rod means having a slot, an axle extending through said slot and through slots in a housing of said second component, a cam mounted on said axle outside said housing, a bearing ear affixed to said housing in front of said cam, said cam having a lever extending therefrom, a break-away line connected to said lever and adapted to be connected to said towing vehicle to move said lever forwardly when pulled by the towing vehicle, said cam being positioned to engage said ear and force said axle rearwardly when said lever is pulled, said cam having a high portion positioned to contact said ear before said lever reaches its maximum forward position to prevent the return of said lever to its original position, even when said line is released.

4. A trailer brake actuator comprising a first component having means for making an attachment to one of a towed and a towing vehicle, a second component having means for making a connection with the other of the towed and the towing vehicle, a master cylinder mounted on said second component and having brake rod means extending therefrom and engageable by said first component when said components are moved toward one another to actuate brakes of the towed vehicle, an axle extending through slots in a housing of said second component and positioned to engage said brake rod means when moved toward said master cylinder, a cam member mounted on said axle, a bearing ear affixed to said housing adjacent said cam member and engageable thereby, a break-away line connected to said cam member and adapted to be connected to said towing vehicle to rotate said cam member when said line is pulled by the towing vehicle, said cam member being positioned to engage said ear and force said axle rearwardly when said line is pulled, said cam member having a high portion positioned to contact said ear to prevent said cam member from returning to its original position even when said line is released.

5. A trailer brake actuator comprising a first component having first means for making an attachment to one of a towed and a towing vehicle, a second component having means for making a connection with the other of the towed and the towing vehicle, a master cylinder mounted on said second component and having brake rod means extending therefrom and engageable by said first component when said components are moved toward one another to actuate brakes of the towed vehicle, an axle held by said second component for transverse movement longitudinally of said housing and positioned to engage said brake rod means when moved toward said master cylinder, a cam member mounted on said axle, bearing means held by said second component adjacent said cam member and engageable thereby, a break-away line connected to said cam member and adapted to be connected to said towing vehicle to rotate said cam member when said line is pulled by the towing vehicle, said cam member being positioned to engage said bearing means and force said axle toward said master cylinder when said line is pulled.

6. A trailer brake actuator comprising a first component having means for making an attachment to one of a towed and a towing vehicle, a second component having means for making a connection with the other of the towed and the towing vehicle, brake fluid pressurizing means mounted on said second component and having brake rod means extending therefrom and engageable by said first component when said components are moved toward one another to actuate brakes of the towed vehicle, an axle supported for transverse movement by said second component, a member mounted on said axle and forming a bearing edge having one portion at a given distance from the axle and another portion at a greater distance from the axle, means forming a second bearing edge supported by said second component in predetermined relationship with respect to said edge forming member, a lever mounted in fixed relationship with respect to said edge forming member and extending therefrom, a break-away line connected to said lever and adapted to be connected to said towing vehicle and to move said lever forwardly when pulled by the towing vehicle, the second edge portion of said edge forming member moving into contact with and beyond said second bearing edge means when said lever is moved to its maximum forward position to lock said lever and said edge forming member in the forward position, even when said line is released.

7. A trailer brake actuator comprising a first component having means for making an attachment to one of a towed and a towing vehicle, a second component having means for making a connection with the other of the towed and the towing vehicle, brake fluid pressurizing means mounted on said second component and having brake rod means extending therefrom and engageable by said first component when said components are moved toward one another to actuate brakes of the towed vehicle, an axle supported for transverse movement by said second component, a member mounted on said axle and forming a bearing edge having one portion at a given distance from the axle, and another portion at a greater distance from the axle, means forming a second bearing edge supported by said second component in predetermined relationship with respect to said edge forming member, a lever mounted in fixed relationship with respect to said edge forming member and extending therefrom, a break-away line connected to said lever and adapted to be connected to said towing vehicle and to move said lever when pulled by the towing vehicle, the second edge portion of said edge forming member moving toward said bearing member when said lever is moved by the line to lock said lever and said edge forming member in the forward position, even when said line is released.

8. A trailer brake actuator comprising a first component having means for making an attachment to one of a towed and a towing vehicle, a second component having means for making a connection with the other of the towed and the towing vehicle, brake fluid pressurizing means mounted on said second component and having brake rod means extending therefrom and engageable by said first component when said components are moved toward one another to actuate brakes of the towed vehicle, an axle supported for transverse movement by said second component, a member mounted on said axle and forming a bearing edge, means forming a second bearing edge supported by said second component in predetermined relationship with respect to said edge forming member, a lever mounted in fixed relationship with respect to said edge forming member and extending therefrom, a break-away line connected to said lever and adapted to be connected to said towing vehicle and to move said lever when pulled by the towing vehicle to force said edge forming member against said bearing member to move said axle toward said pressurizing means.

9. A trailer brake actuator comprising a first component having means for making a connection with a towing vehicle, a second component having means for making a connection with a towed vehicle, a master cylinder mounted on said second component and having a brake rod extending therefrom, a rod extension movable with said brake rod and engageable by said first component when moved rearwardly to actuate brakes of the towed vehicle, said rod extension having a slot, an axle extending through said slot and through slots in a housing of said second component, a cam mounted on each end of said axle outside of said housing, bearing ears affixed to said housing in front of said cams, said cams having levers extending upwardly therefrom, a break-away line connected to said levers and adapted to be connected to said towing vehicle to move said levers forwardly when pulled by the towing vehicle, said cams positioned to engage said ears and to force said axle rearwardly when said levers are pulled, said cams having high portions positioned to contact said ears before said levers reach their maximum forward positions to lock said cams and prevent their return to their original position, even when said line is released, a reservoir for said master cylinder for holding a supply of brake fluid, said reservoir having a filler opening for adding additional brake fluid thereto, a brake fluid retainer including a threaded connection affixed to said filler opening, means forming a first container affixed to said threaded connection, said threaded connection having an opening therethrough communicating with said first container, a baffle affixed to said first container and positioned transversely across said threaded connection opening, said first container including a top wall, a cup member affixed to said top wall and forming a second container within said first container, said cup member having a plurality of vent openings communicating with said first container, and said top wall having a vent communicating with said second container, said cup member being concentrically positioned relative to said first container.

References Cited

UNITED STATES PATENTS

| | | | |
|---|---|---|---|
| 2,704,585 | 3/1955 | Stromberg | 188—3 |
| 3,168,940 | 2/1965 | Ross et al. | 188—112 |

DUANE A. REGER, *Primary Examiner.*